US012293734B2

(12) United States Patent
Xu et al.

(10) Patent No.: US 12,293,734 B2
(45) Date of Patent: May 6, 2025

(54) COMPENSATION DEVICE, DISPLAY PANEL, AND COMPENSATION METHOD THEREOF

(71) Applicant: TCL CHINA STAR OPTOELECTRONICS TECHNOLOGY CO., LTD., Guangdong (CN)

(72) Inventors: Ling Xu, Guangdong (CN); Qian Wang, Guangdong (CN); Xinyi Kang, Guangdong (CN); Kaiyong Yi, Guangdong (CN); Yufeng Jin, Guangdong (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 29 days.

(21) Appl. No.: 18/330,638

(22) Filed: Jun. 7, 2023

(65) Prior Publication Data

US 2024/0257776 A1 Aug. 1, 2024

(30) Foreign Application Priority Data

Jan. 31, 2023 (CN) ........................ 202310145249.0

(51) Int. Cl.
*G09G 3/36* (2006.01)

(52) U.S. Cl.
CPC ... *G09G 3/3607* (2013.01); *G09G 2300/0842* (2013.01); *G09G 2310/027* (2013.01); *G09G 2320/0626* (2013.01); *G09G 2320/0673* (2013.01)

(58) Field of Classification Search
None
See application file for complete search history.

(56) References Cited

U.S. PATENT DOCUMENTS

| | | | | |
|---|---|---|---|---|
| 2015/0287385 A1* | 10/2015 | Wu | G09G 5/10 345/691 |
| 2017/0046995 A1* | 2/2017 | Chen | G09G 3/2003 |
| 2020/0168149 A1* | 5/2020 | Liu | G09G 3/007 |
| 2021/0350751 A1* | 11/2021 | Lee | G09G 3/3275 |
| 2024/0046897 A1* | 2/2024 | Wang | G06V 10/751 |

* cited by examiner

*Primary Examiner* — Christopher R Lamb
(74) *Attorney, Agent, or Firm* — PV IP PC; Wei Te Chung

(57) ABSTRACT

A compensation method of a display panel includes controlling a first display part of a target panel to display a light load image based on a standard gamma curve, controlling a second display part of the target panel to display a heavy load image, acquiring a first brightness of a first color sub-pixels in an (N1+1)th row electrically connected to a first data line of the first display part, acquiring a second brightness of the first color sub-pixels in an (N2+1)th row of a first sub-display part of the second display part electrically connected to a second data line, and according to a difference between the first brightness and the second brightness, determining a first compensation data corresponding to the first gray scale and the second preset gray scale of at least the first color sub-pixels of the first sub-display part in the target panel.

11 Claims, 4 Drawing Sheets

COMPENSATION DEVICE, DISPLAY PANEL, AND COMPENSATION METHOD THEREOF

CROSS-REFERENCE TO RELATED APPLICATION

This application claims priority to and the benefit of Chinese Patent Application No. 202310145249.0, filed on Jan. 31, 2023, the disclosure of which is incorporated herein by reference in its entirety.

TECHNICAL FIELD

The present invention relates to the field of display technologies, in particular to the manufacture of display devices, and in particular to compensation devices, display panels, and compensation methods thereof.

BACKGROUND

Liquid crystal displays are widely used as displays at present. At present, considering the cost of a data-driven chip, a three-gate drive architecture can be used to reduce the number of data lines to ⅓ of a normal drive architecture. In addition, the number of scanning lines is increased to three times that of the normal drive structure, so that a width and a charging time of each gate pulse are also reduced to ⅓ of the normal drive structure.

In the three-gate drive architecture, on one hand, as shown in FIG. 1, when a solid-color image is displayed, an amplitude of a signal on the same data line (each of D1, D2, and D3 to Dn) is always in a state of high and low changes. This may render as a heavy load image. After each gate line (each of G1, G2, and G3 to Gn) turns on a corresponding row of pixels, a charging time of each row of pixels is insufficient, resulting in uneven charging and display. On the other hand, due to the difference of other factors in the display, non-charging display may also be uneven. At least two types of compensation data are usually stored and used in existing displays respectively. Corresponding compensation is made for display defects caused by at least two reasons, resulting in a large storage space required by the display and increasing the cost of the display.

SUMMARY

The present invention provides a compensation device, a display panel and a compensation method thereof, so as to solve the technical problem of large storage space requirement caused by storing at least two kinds of compensation data used for performing at least two different compensations separately in the existing display.

An embodiment of the present invention provides a compensation method of a display panel, comprising:

- controlling a first display part of a target panel to display a light load image based on a standard gamma curve, wherein corresponding sub-pixels in an N1th row electrically connected to a first data line in the light load image are displayed in a first preset gray scale, corresponding sub-pixels in an (N1+1)th row are displayed in a first gray scale, and N1 is a positive integer;
- controlling a second display part of the target panel to display a heavy load image, wherein the second display part is located on at least one side of the first display part, corresponding sub-pixels in an N2 row electrically connected to a second data line in the heavy load image are displayed in a second preset gray scale, corresponding sub-pixels in an (N2+1)th row are displayed in the first gray scale, N2 is a positive integer, N2 is equal to or not equal to N1, the first data line and the second data line are the same or different, and the sub-pixels in the (N1+1)th row and the sub-pixels in the (N2+1)th row are both first color sub-pixels;
- acquiring a first brightness of the first color sub-pixels in the (N1+1)th row electrically connected to the first data line of the first display part;
- acquiring a second brightness of the first color sub-pixels in the (N2+1)th row of a first sub-display part of the second display part electrically connected to the second data line; and
- according to a difference between the first brightness and the second brightness, determining a first compensation data corresponding to the first gray scale and the second preset gray scale of at least the first color sub-pixels of the first sub-display part in the target panel.

In some embodiments, the first preset gray scale is equal to the first gray scale.

In some embodiments, corresponding sub-pixels in an N3th row electrically connected to a third data line in the heavy load image are displayed in a third preset gray scale, the first color sub-pixels corresponding to an (N3+1)th row are displayed in the second gray scale, the third preset gray scale is the same as or different from the second preset gray scale, and/or the second gray scale is the same as or different from the first gray scale, N3, N2, and N1 are the same or not the same, and the first data line, the second data line, and the third data line are the same or different, the method further comprises:

- acquiring a third brightness of the first color sub-pixels in an (N3+1)th row electrically connected to the third data line in a second sub-display part of the second display part, and the third brightness is different from the second brightness;
- according to a difference between the first brightness and the third brightness, determining a second compensation data of at least the first color sub-pixels of the second sub-display part in the target panel corresponding to the second gray scale and the third preset gray scale.

In some embodiments, the second sub-display part is adjacent to the first sub-display part.

In some embodiments, there are a plurality of sub-pixels between the second sub-display part and the first sub-display part.

In some embodiments, the sub-pixels in the N1 row in the light load image are displayed in the first preset gray scale, the first color sub-pixels corresponding to the (N1+1)th row are displayed in the first gray scale;

- the sub-pixels in the N2 row in the heavy load image are displayed in the second preset gray scale, the first color sub-pixels corresponding to the (N2+1)th row are displayed in the first gray scale;
- acquiring the first brightness of the first color sub-pixels in the (N1+1)th row electrically connected to the first data line of the first display part comprises:
- acquiring a plurality of first actual brightness values corresponding to the first color sub-pixels in the (N1+1)th row of the first display part, and calculating an average value of the plurality of the first actual brightness values as the first brightness;
- acquiring the second brightness of the first color sub-pixels in the (N2+1)th row of the first sub-display part of the second display part electrically connected to the second data line comprises:

acquiring a plurality of second actual brightness values corresponding to the first color sub-pixels in the (N2+1)th row of the first sub-display part, and calculating an average value of the plurality of second actual brightness values as the second brightness.

In some embodiments, controlling the first display part of the target panel to display the light load image based on the standard gamma curve comprises:

according to a difference between the standard gamma curve and an original gamma curve of the first display part, determining a third compensation data of the first display part;

according to the third compensation data, controlling the first display part to display the light load image.

In some embodiments, the display panel comprises a plurality of rows of sub-pixels, each row of sub-pixels is the first color sub-pixels, second color sub-pixels, or third color sub-pixels, the plurality of rows of sub-pixels are arranged cyclically in an order of the second color sub-pixels, the third color sub-pixels, and the first color sub-pixels in a column direction, and the method comprises:

controlling the first display part of the target panel to display the light load image based on the standard gamma curve, and in the light load image, the second color sub-pixels, the third color sub-pixels, and the first color sub-pixels are displayed in a first test gray scale;

controlling the second display part of the target panel to display the heavy load image, wherein the second display part is located on at least one side of the first display part, the second color sub-pixels and the third color sub-pixels in the heavy load image are displayed in a second test gray scale, and the first color sub-pixels are displayed in the first test gray scale;

acquiring a first test brightness of the first color sub-pixels in the first display part;

acquiring a second test brightness of the sub-pixels of the first sub-display part in the second display part; and according to a difference between the first test brightness and the second test brightness, determining a fourth compensation data corresponding to the first test gray scale and the second test gray scale of at least the first color sub-pixels of the first sub-display part in the target panel.

An embodiment of the present invention provides a compensation method of a display panel, comprising:

wherein the display panel comprises a plurality of rows of sub-pixels, each row of sub-pixels is the first color sub-pixels, second color sub-pixels, or third color sub-pixels, the plurality of rows of sub-pixels are arranged cyclically in an order of the second color sub-pixels, the third color sub-pixels, and the first color sub-pixels in a column direction, and the method comprises:

controlling the first display part of the target panel to display the light load image based on the standard gamma curve, and in the light load image, the second color sub-pixels, the third color sub-pixels, and the first color sub-pixels are displayed in a first test gray scale;

controlling the second display part of the target panel to display the heavy load image, wherein the second display part is located on at least one side of the first display part, the second color sub-pixels and the third color sub-pixels in the heavy load image are displayed in a second test gray scale, and the first color sub-pixels are displayed in the first test gray scale;

acquiring a first test brightness of the first color sub-pixels in the first display part;

acquiring a second test brightness of the sub-pixels of the first sub-display part in the second display part; and according to a difference between the first test brightness and the second test brightness, determining a fourth compensation data corresponding to the first test gray scale and the second test gray scale of at least the first color sub-pixels of the first sub-display part in the target panel.

An embodiment of the present invention further provides a display panel, comprising:

a processor configured to use the first compensation data determined according to the compensation method of the display panel as described above, and/or the fourth compensation data determined according to the compensation method of the display panel as described above to at least compensate the brightness of the sub-pixels in the first sub-display part.

In some embodiments, the display panel further includes:

a memory, configured to store the first compensation data determined according to the above compensation method of the display panel, and/or the fourth compensation data determined according to the above compensation method of the display panel.

An embodiment of the present invention further provides a compensation device configured to perform the above compensation method of the display panel.

Embodiments of the present invention provide a compensation device, a display panel, and a compensation method thereof. The first display part of the control target panel displays a light load image based on a standard gamma curve. The second display part of the target panel is controlled to display a heavy load image. Acquire the first brightness of the first color sub-pixels in the (N1+1)th row electrically connected to the first data line of the first display part. Acquire the second brightness of the first color sub-pixels in the (N2+1)th row of the first sub-display part in the second display part electrically connected to the second data line. According to the difference between the first brightness and the second brightness, it is determined that determined that at least the first color sub-pixel of the first sub-display part in the target panel corresponds to the first compensation data of the first gray scale and the second preset gray scale. That is to say, the present invention can use the first compensation data to improve at least the sub-pixels of the first sub-display part in the target panel when they are subjected to the above gray scale change (caused by brightness change, and the end point is the second brightness). The defect of uneven brightness is caused by two reasons that do not meet the brightness standard recognized by the human eye and uneven charging and display. This avoids storing at least two sets of data to respectively improve the above drawbacks, reducing the cost of the display panel.

BRIEF DESCRIPTION OF THE DRAWINGS

The present invention will be further described below by means of the accompanying drawings. It should be noted that the drawings in the following description are only used to explain some embodiments of the present invention. For those skilled in the art, other drawings can also be obtained based on these drawings without any creative effort.

DETAILED DESCRIPTION

The technical solutions in the embodiments of the present invention will be clearly and completely described below in conjunction with the drawings in the embodiments of the present invention. Apparently, the described embodiments are only some of the embodiments of the present invention, but not all of them. Based on the embodiments of the present invention, all other embodiments obtained by those skilled in the art without creative efforts fall within the protection scope of the present invention.

In the description of the present invention, the terms "first", "second" and so on are only used for descriptive purposes and cannot be understood as indicating or implying relative importance or implicitly specifying the quantity of indicated technical features. Thus, a feature defined as "first" or "second" may explicitly or implicitly include one or more of said features. In addition, it should be noted that the drawings only provide structures closely related to the present invention, omitting some details that are not closely related to the invention, in order to simplify the drawings and make the points of the invention clear at a glance. It does not mean that the actual device is exactly the same as the accompanying drawings and is not a limitation of the actual device.

Reference herein to an "embodiment" means that a particular feature, structure, or characteristic described in connection with the embodiment can be included in at least one embodiment of the present invention. The occurrences of this phrase at various temporal locations in the specification are not necessarily all referring to the same embodiment, nor are separate or alternative embodiments mutually exclusive of other embodiments. It is understood explicitly and implicitly by those skilled in the art that the embodiments described herein can be combined with other embodiments.

The present invention provides a compensation method of a display panel, and the method includes but is not limited to the following embodiments and combinations of the following embodiments.

Figure 1:
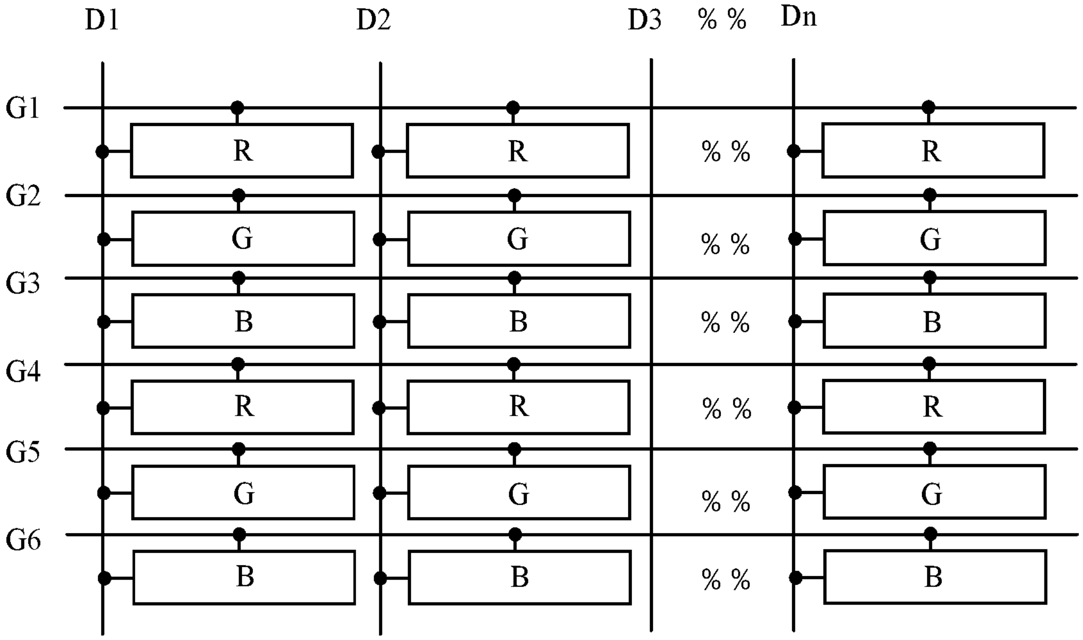
FIG. 1 is a schematic diagram of connections among pixels, gate lines and data lines in a display panel with a triple-gate drive architecture provided by an embodiment of the present invention.
Figure 2:
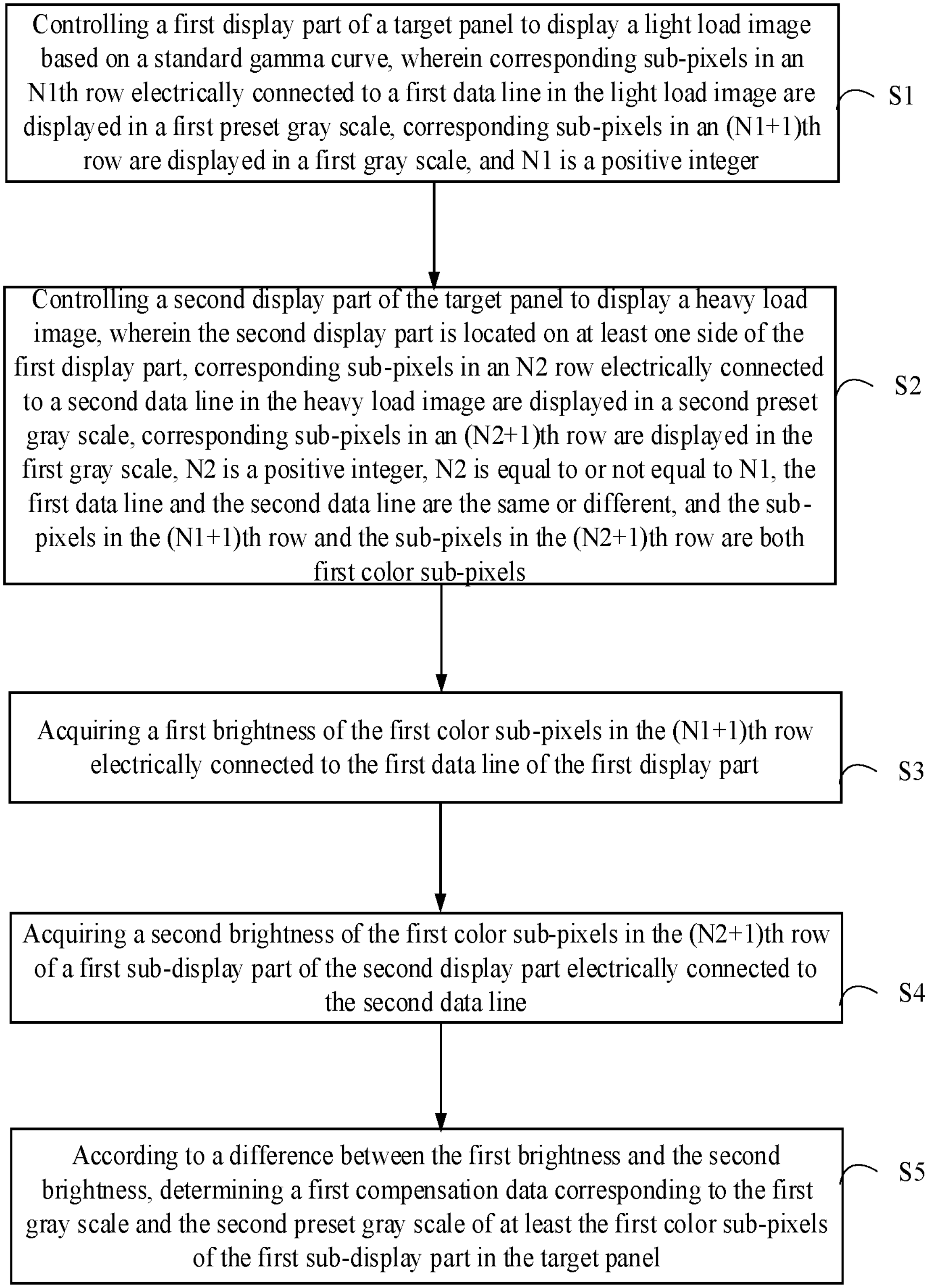
FIG. 2 is a flowchart of an embodiment of a compensation method of a display panel provided by an embodiment of the present invention.

In one embodiment, as shown in FIG. 2, the compensation method of the display panel includes but not limited to the following operations.

Operation S1: Controlling a first display part of a target panel to display a light load image based on a standard gamma curve, wherein corresponding sub-pixels in an N1th row electrically connected to a first data line in the light load image are displayed in a first preset gray scale, corresponding sub-pixels in an (N1+1)th row are displayed in a first gray scale, and N1 is a positive integer.

Each sub-pixel in each display panel may have a corresponding gamma curve, and all sub-pixels may also correspond to the same gamma curve. Specifically, the abscissa of the gamma curve may represent the gray scale value applied to the corresponding sub-pixel in the target panel. The ordinate of the gamma curve represents the brightness value of the sub-pixel emitting light under the action of the voltage value. It can be considered that the relationship between the brightness value and the gray scale value in different gamma curves is different. In particular, when the relationship between the brightness value and the gray scale value is set based on the habits of human eyes, the corresponding gamma curve is the standard gamma curve. That is, it can be considered that in the standard gamma curve, each brightness value and the change of the brightness value conform to the corresponding gray scale value and the change of the corresponding gray scale value recognized by human eyes. That is, the brightness value that should have and the change of brightness value.

It should be noted that the target panel before operation S1 is executed may not satisfy the standard gamma curve. That is, at least in the first display part of the target panel, the gamma curve of at least one sub-pixel is different from the standard gamma curve. That is, the relationship between the brightness value of the sub-pixel and the gray scale value applied to the sub-pixel does not conform to human perception.

It can be understood that in operation S1 of this embodiment, on the one hand, the first display part may be controlled to display a light load image. On the other hand, it is combined with the above definition of "standard gamma curve", The relationship between the brightness value of at least one sub-pixel (or all the sub-pixels) in the light loaded image presented by the first display part and the gray scale value acting on the sub-pixel may conform to human perception. At least compared with the above relationship in the light load image presented by other display parts in the target panel, it is equivalent to improve the defect that the brightness standard that does not meet the human eye perception is improved.

Further, in this embodiment, it is further defined that at least two adjacent rows of sub-pixels connected to the first data line in the light load image display at the first preset gray scale and the first gray scale respectively.

Figure 6:
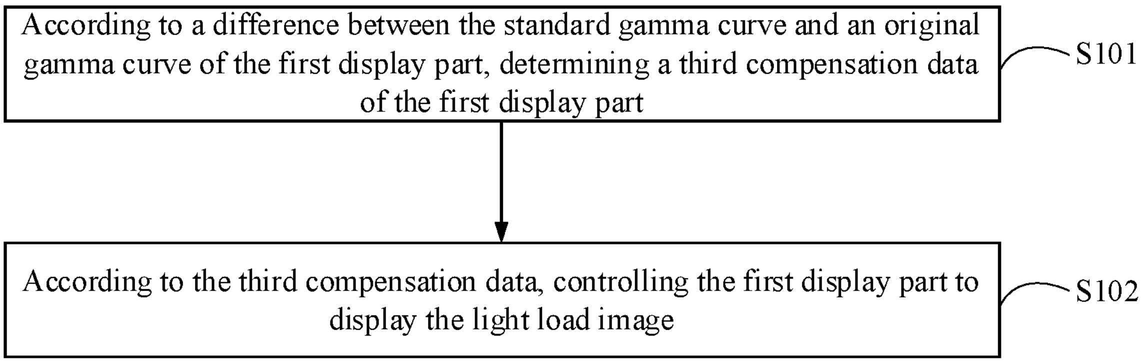
FIG. 6 is a flowchart of another embodiment of a compensation method of a display panel provided by an embodiment of the present invention.

As shown in FIG. 6, operation S1 may include but not limited to the following operations.

Operation S101: According to a difference between the standard gamma curve and an original gamma curve of the first display part, determining a third compensation data of the first display part.

In combination with the above discussion, the target panel before performing operation S1 may be considered not to meet the standard gamma curve. That is, the gamma curve of the target panel that does not meet the standard gamma curve is also the original gamma curve of the first display part in operation S101.

Specifically, combined with the definition of the gamma curve above, there may be differences between the standard gamma curve and the original gamma curve in the same abscissa (the gray scale value of the corresponding sub-pixel) corresponding to the ordinate (the brightness value of the sub-pixel emitting light under the action of the voltage value). According to the above differences, the corresponding gray scale value in the original gamma curve can be adjusted, so that the corresponding brightness value is close to or even equal to the corresponding brightness value in the standard gamma curve. The difference between the adjusted abscissa and the pre-adjusted abscissa (that is, the difference of the gray scale value) may be recorded as the corresponding third sub-compensation data. Further, for each brightness value in the standard gamma curve, the corresponding voltage value in the original gamma curve can be adjusted by a corresponding third sub-compensation data. This makes the adjusted brightness value close to or even equal to that in the standard gamma curve. By analogy, a plurality of third sub-compensation data forms third compensation data.

The standard gamma curve may be a gamma curve obtained through adjustment of a standard panel different from the target panel to conform to the corresponding gray scale value recognized by human eyes and the change of the corresponding gray scale value. Compared with the target panel, the standard panel can be regarded as a panel that excludes other unfavorable factors, that is, a panel that is close to the ideal.

Operation S102: According to the third compensation data, controlling the first display part to display the light load image.

Specifically, according to the second sub-compensation data respectively corresponding to each brightness value in the second compensation data, the gray scale values (that is, the voltage values) of the sub-pixels in the first display part are correspondingly adjusted to realize a light load image conforming to a standard gamma curve.

Operation S2: Controlling a second display part of the target panel to display a heavy load image, wherein the second display part is located on at least one side of the first display part, corresponding sub-pixels in an N2 row electrically connected to a second data line in the heavy load image are displayed in a second preset gray scale, corresponding sub-pixels in an (N2+1)th row are displayed in the first gray scale, N2 is a positive integer, N2 is equal to or not equal to N1, the first data line and the second data line are the same or different, and the sub-pixels in the (N1+1)th row and the sub-pixels in the (N2+1)th row are both first color sub-pixels.

Specifically, the target panel may be an OLED display panel or a liquid crystal display panel. The sub-pixels in the OLED display panel emit light through self-luminous devices driven by voltage or current. The luminous brightness of the sub-pixel is related to the current or voltage flowing through the self-luminous device and the duration of the action of the current or voltage. The sub-pixels in the liquid crystal display panel emit light through the liquid crystal layer through the light from the backlight. The light transmittance of the liquid crystal layer is related to the magnitude of the voltage applied to both ends of the liquid crystal layer. The light of the backlight source is related to the current or voltage flowing through the backlight source and the duration of the action of the current or voltage.

It should be noted that, at least for liquid crystal display panels, it takes time for the liquid crystal to deflect. For the display data of sub-pixels in a row connected to the same data line is different from the display data of sub-pixels in the previous row (at least two sub-pixels in the same column have different display data), when the voltage applied across the multiple liquid crystal molecules corresponding to the sub-pixels in this row is just equal to the voltage corresponding to the corresponding gray scale value, it may not be possible to deflect the corresponding angle within the charging time of the sub-pixels in this row to achieve the corresponding brightness. This leads to the issue of uneven charging and display in the corresponding frame. In other words, the deflection of two parts of liquid crystal molecules corresponding to two adjacent sub-pixels in the same row with different display data may also be affected by each other. This causes a similar issue of uneven charging display.

Light load image and heavy load can be compared as two concepts. That is, referring to the above discussion, compared with the heavy load screen (not limited to the liquid crystal display panel), the light load image can be understood as the difference between the display data of the sub-pixels in two adjacent rows or columns is small. Alternatively, the number of rows or columns of sub-pixels with differences in display data is relatively small. Therefore, in combination with the above discussion, under the same conditions, the heavy load image is compared with the light load image. It can be considered that the issue of uneven display brightness caused by the time required for liquid crystal deflection as described above is more likely to appear.

It should be noted that the essence of the issue of uneven display brightness is due to the sudden change of the data signal transmitted on the same data line. This results in insufficient charging of the sub-pixels in the next row. Therefore, in this embodiment, there is no limitation on whether the specific colors of the sub-pixels in the (N1+1)th row and the sub-pixels in the (N2+1)th row are the same.

Based on the above discussion, it is further defined in this embodiment that at least two adjacent rows of sub-pixels connected to the second data line in the heavy load image are displayed in the second preset gray scale and the first gray scale respectively. Here, it is defined that the sub-pixels in the (N1+1)th row and the sub-pixels in the (N2+1)th row are all first color sub-pixels. According to the comparison between the "light load image and heavy load image" above, it can be considered that this corresponds to the first preset gray scale of the light load image. Compared with the second preset gray scale corresponding to the heavy load image, it is closer to the first gray scale. That is, when the objects are all first color sub-pixels, the issue of uneven display brightness is weaker in a light load image than in a heavy load image.

Operation S3: Acquiring a first brightness of the first color sub-pixels in the (N1+1)th row electrically connected to the first data line of the first display part.

The target panel may include sub-pixels of at least one color, for example may include a first color sub-pixel. Specifically, in conjunction with the discussion in operation S1, the first display part displays a light load image based on a standard gamma curve. That is, the first brightness can be understood as not easy to appear or there is no such issue as the uneven display brightness caused by the liquid crystal deflection taking time as mentioned above. There is also the defect of brightness that does not conform to the perception of the human eye. That is, the first brightness can be used as a reference standard for improving the issue of uneven charging display.

Further, in order to improve the referenceability of the first brightness, it may be set that the first preset gray scale is equal to the first gray scale. That is, it can be considered that there is no issue of uneven charging and display in the first brightness.

Operation S4: Acquiring a second brightness of the first color sub-pixels in the (N2+1)th row of a first sub-display part of the second display part electrically connected to the second data line.

In combination with the above discussion, both the first display part and the first sub-display part in the second display may include sub-pixels of the first color. Here, neither the color nor the first gray scale of the first color sub-pixel is limited. Specifically, it can be seen from the discussion of operation S4 that the light load image and the heavy load image are displayed on the first sub-display part of the first display part and the second display part respectively. The difference between the theoretical brightness displayed by the first color sub-pixels in the first display part under the first preset gray scale and the current first brightness. It should also be smaller than the difference between the theoretical brightness displayed by the first color sub-pixels in the first sub-display part under the second preset gray scale and the current second brightness. The first brightness presented by the sub-pixels of the first display part is closer to the "theoretical corresponding brightness" than the second brightness presented by the sub-pixels of the first sub-display part. Therefore, it can be used as a standard for improving the brightness corresponding to the issue of uneven charging and display.

It should be noted that, in this embodiment, the specific order of operation S1 to operation S4 is not limited as above. For example, operation S1 and operation S3 may also be performed sequentially first, and then operation S2 and operation S4 may be performed sequentially.

Further, in operation S1, the plurality of sub-pixels in row N1 in the light load image are displayed in the first preset gray scale. The plurality of the first color sub-pixels corresponding to the (N1+1)th row are displayed in the first gray scale. Based on this, operation S3 may include but not limited to the following operations: acquiring a plurality of first actual brightness values corresponding to the first color sub-pixels in the (N1+1)th row of the first display part, and calculating an average value of the plurality of the first actual brightness values as the first brightness.

It can be understood that, in this embodiment, it is equivalent to further limiting the plurality of sub-pixels displayed at the first preset gray scale to be the N1th row. Displayed in the first gray scale are a plurality of sub-pixels of the first color in the (N1+1)th row. Then, in order to improve the accuracy of the first brightness measurement, in this embodiment, the average value of the plurality of first actual brightness values corresponding to the plurality of first color sub-pixels in the (N1+1)th row displayed at the first gray scale is taken as the first brightness. The plurality of first actual brightness values corresponding to the plurality of sub-pixels considered comprehensively.

Similarly, the plurality of sub-pixels in N2 row in the heavy load image are displayed in the second preset gray scale, and the corresponding plurality of first color sub-pixels of in the (N2+1) row displayed in the first gray scale. Based on this, operation S4 may include but not limited to the following steps: acquiring a plurality of second actual brightness values corresponding to the first color sub-pixels in the (N2+1)th row of the first sub-display part, and calculating an average value of the plurality of second actual brightness values as the second brightness.

Similarly, in this embodiment, the average value of the plurality of brightness values corresponding to the plurality of first color sub-pixels in the (N2+1)th row displayed at the first gray scale is taken as the second actual brightness. The plurality of second actual brightness values corresponding to the plurality of sub-pixels are comprehensively considered, thereby improving the accuracy of the measurement of the second brightness.

Operation S5: According to a difference between the first brightness and the second brightness, determining a first compensation data corresponding to the first gray scale and the second preset gray scale of at least the first color sub-pixels of the first sub-display part in the target panel.

Specifically, in combination with the discussion about operations S1 to S4 above, the first brightness is more corresponding to a standard gamma curve and a light load image than the second brightness. Therefore, the difference between the first brightness and the second brightness may also include the difference between the non-standard gamma curve and the standard gamma curve, and the difference between the light load image and the heavy load image. Therefore, the first compensation data that the sub-pixels of the target panel correspond to the second brightness determined according to the difference can at least be used to compensate for the defect phenomenon that the sub-pixels of the target panel appear as the second brightness under the first gray scale. The "brightness" can be understood as, in the operation S4, in the two adjacent sub-pixels in the same column (that is, connected to the same data line) corresponding to two different grayscale values, the display data is received later and the brightness of the first color sub-pixel corresponding to the first gray scale has a brightness defect. The first compensation data can be used to improve at least the sub-pixels of the first sub-display part in the target panel when they are subjected to the above gray scale change, the defect of uneven brightness is caused by two reasons that do not meet the brightness standard recognized by the human eye and uneven charging and display. This avoids storing at least two sets of data to respectively improve the above drawbacks, reducing the cost of the display panel.

Likewise, this embodiment may also be applicable to display panels including but not limited to self-luminous devices such as OLED display panels. Because the brightness standard recognized by human eyes needs to be considered in any display panel, a general sub-pixel needs to emit light under the driving of a corresponding pixel driving circuit. When the display data on the same data line changes, a series of inaccurate voltages acting on the sub-pixels are also caused by coupling capacitors or storage capacitors. In this embodiment, both can be simultaneously improved through, for example, the first compensation data.

As discussed above, the first preset gray scale may be equal to the first gray scale. That is, in the light load image displayed on the first display part, the first color sub-pixels in the (N1+1)th row do not have brightness defects caused by insufficient handicap. However, in the heavy load image displayed by the first sub-display part of the second display part, the first color sub-pixels in the (N2+1)th row do not have brightness defects caused by insufficient handicap.

Therefore, in combination with the above discussion about operation S5, the difference between the first brightness and the second brightness also includes the difference between the non-standard gamma curve and the standard gamma curve. In this embodiment, for example, the first compensation data can be used to improve the first color sub-pixel in the target panel, the defect of uneven brightness is caused by the two reasons that do not meet the brightness standard recognized by the human eye and uneven charging and display when subjected to the above gray scale changes.

Figure 3:
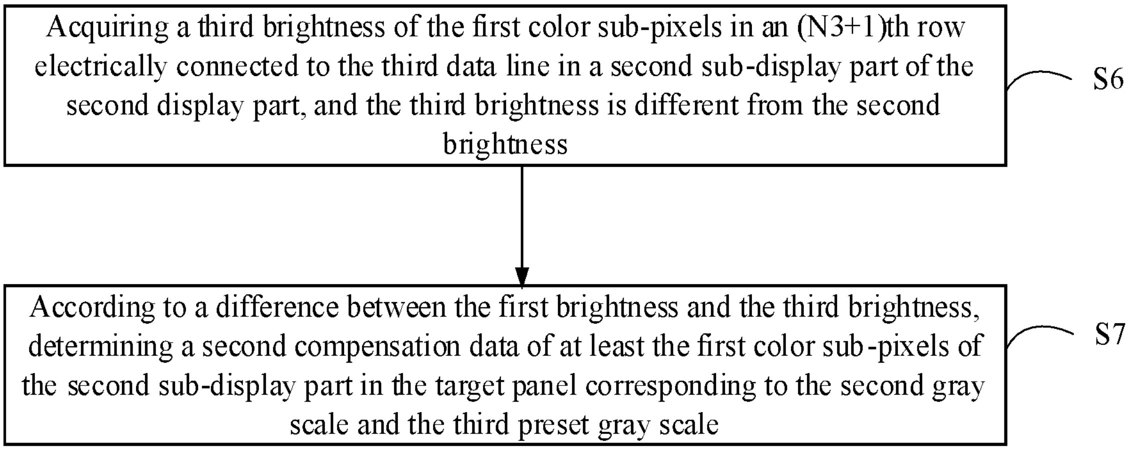
FIG. 3 is a flowchart of another embodiment of a compensation method of a display panel provided by an embodiment of the present invention.

In an embodiment, the corresponding sub-pixels in the N3th row electrically connected to the third data line in the reloading frame are displayed in a third preset gray scale. The sub-pixels of the first color corresponding to the (N3+1)th row are displayed in the second gray scale. The third preset gray scale is the same as or different from the second preset gray scale, and/or the second gray scale is the same as or different from the first gray scale. The N3, the N2 and the N1 are all equal or unequal. The first data line, the second data line, and the third data line are the same or different. Based on this, as shown in FIG. 3, the compensation method of the display panel further includes but not limited to the following operations.

Operation S6: Acquiring a third brightness of the first color sub-pixels in an (N3+1)th row electrically connected to the third data line in a second sub-display part of the second display part, and the third brightness is different from the second brightness.

Further, as discussed in operation S6, in this embodiment, the brightness difference between two adjacent sub-pixels in the second sub-display part is further limited. Different from the brightness difference between two adjacent sub-pixels in the first sub-display part, for example, it may be greater than or smaller than the brightness difference between two adjacent sub-pixels in the first display part. That is, the first sub-display part and the second sub-display part may be two different display parts in the second display part. The difference between the two is that the first color sub-pixels emit light in the first gray scale and respectively have the second brightness and the third brightness that are greater than the first brightness and different from each other. There are two reasons for the difference between the third brightness and the first brightness:

The first aspect can be understood with reference to the relevant discussion above about the reason for the difference between the second brightness and the first brightness. That is, it can be understood as the brightness difference caused by the gray scale jump of two adjacent sub-pixels, as shown in Table 1. Grayscale 1 may represent the third preset gray scale when the sub-pixels in N2 row or N3 row are displayed. Gray scale 2 may represent the second gray scale when the first color sub-pixels in the (N2+1)th row or (N3+1)th row are displayed.

Here, the third preset gray scale can be different from the second preset gray scale, and the second preset gray scale can be the same as the first gray scale as an example for illustration. That is, the start points of the gray scale transitions are different and the end points are the same. For example, for the same first gray scale (i.e., grayscale 2, e.g., 8), here it can be considered that the sub-pixels in N2 row that cause the second brightness are gray scale 1 (e.g., equal to 4), and gray scale 1 (for example, equal to 244) of the sub-pixels in row N3 that is different from the third brightness.

TABLE 1

| gray | gray scale 1 | | | | | | |
|---|---|---|---|---|---|---|---|
| scale 2 | 0 | 4 | 8 | . . . | 224 | 240 | 255 |
| 0 | X11 | X12 | X13 | . . . | X1(n − 2) | X1(n − 1) | X1n |
| 4 | X21 | X22 | X23 | . . . | X2(n − 2) | X2(n − 1) | X2n |
| 8 | X31 | X32 | X33 | . . . | X3(n − 2) | X3(n − 1) | X3n |
| . . . | . . . | . . . | . . . | . . . | . . . | . . . | . . . |
| 224 | X(n − 2)1 | X(n − 2)2 | X(n − 2)3 | . . . | X(n − 2)(n − 2) | X(n − 2)(n − 1) | X(n − 2)n |
| 240 | X(n − 1)1 | X(n − 1)2 | X(n − 1)3 | . . . | X(n − 1)(n − 2) | X(n − 1)(n − 1) | |
| 255 | Xn1 | Xn2 | Xn3 | . . . | | Xn(n − 1) | Xnn |

the gray scale 1(4) of the sub-pixels in the N2th row causing the third brightness is the same as the gray scale 1(4) of the sub-pixels in the N3th row causing the second brightness. However, the distance between the first sub-display part and the second sub-display part is too far, which may also cause a difference between the second brightness and the third brightness.

In particular, the second sub-display part and the first sub-display part may be arranged adjacent to each other. In combination with the above discussion, since the distance between the second sub-display part and the first sub-display part is relatively small, there may be no difference in brightness between the two due to the distance. Further, if the third preset gray scale is the same as the second preset gray scale, and the second gray scale is the same as the first gray scale, it can be considered that the second brightness is equal to the third brightness. That is, there is no need to divide into two display parts to measure the brightness difference, and at least operation S6 can be saved.

Operation S7: According to a difference between the first brightness and the third brightness, determining a second compensation data of at least the first color sub-pixels of the second sub-display part in the target panel corresponding to the second gray scale and the third preset gray scale.

Specifically, the difference between the third brightness and the second brightness may be caused by the above reasons. Therefore, the first compensation data and the second compensation data are respectively determined according to their respective differences with the first brightness. This can be respectively applied to compensate the defects that the first color sub-pixels of the first sub-display part in the target panel appear as the second brightness, and the defects that the first color sub-pixels of the second sub-display part in the target panel appear as the third brightness. For operation S7, reference may be made to the related description of operation S5.

Continuing the example in the first aspect above. For the convenience of comparison, here, it is taken as an example that the second sub-display part and the first sub-display part are adjacent to each other or are the same (that is, there is no need to consider the brightness difference due to the distance). For the first gray scale equal to the second gray scale (that is, gray scale 2, for example, 8), and when the second preset gray scale (for example, gray scale 1 is equal to 4) is different from the third preset gray scale (for example, gray scale 1 is equal to 244), then the corresponding first compensation data and second compensation data of both the second sub-display part and the first sub-display part can be X32 and X(n−2)2 respectively. Further, when the third preset gray scale is the same as the second preset gray scale, and when the second gray scale is the same as the first gray scale, then it can be considered that the second brightness is In the second aspect, it can be considered that the distance between the first sub-display part and the second sub-display part is relatively long. For example, there are a plurality of sub-pixels between the second sub-display part and the first sub-display part. For the convenience of comparison, here, the third preset gray scale is the same as the second preset gray scale, and the second preset gray scale is the same as the first gray scale as an example for description. That is, the start points and end points of the gray scale transitions are the same. For example, for the same first gray scale (that is, the second gray scale, gray scale 2, for example, 8), even if equal to the third brightness. Operations S6 to S7 may also be omitted. That is, the first compensation data can be applied to compensate the defect that the first color sub-pixels in the second sub-display part and the first sub-display part appear at the second brightness (i.e., the third brightness).

Figure 5:
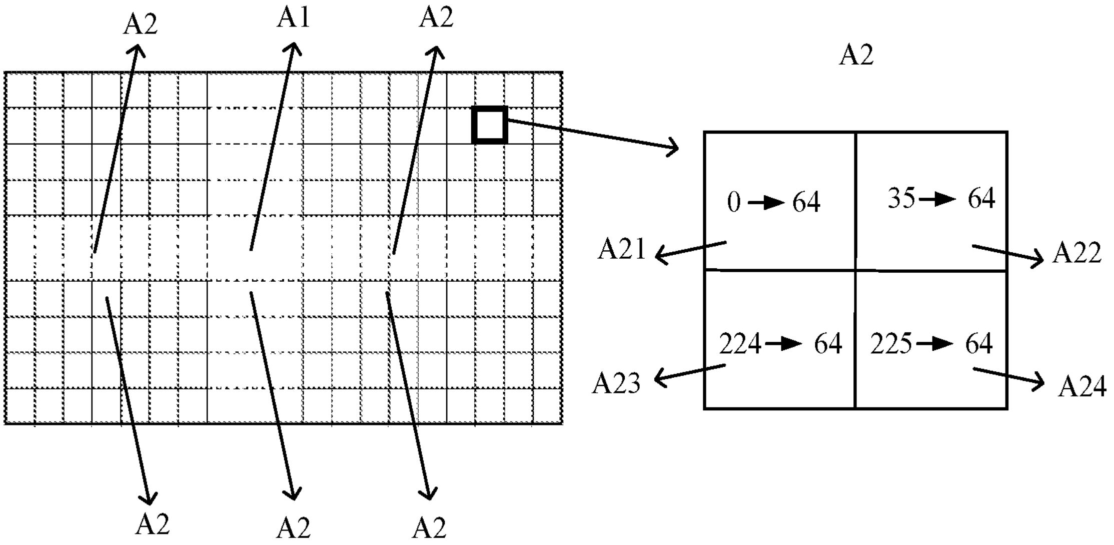
FIG. 5 is another arrangement diagram of a first display part and a second display part in a target panel provided by an embodiment of the present invention.

Specifically, as shown in FIG. 5, for the second display part A2, for example, the second display part A2 may include a first sub-display part A21 and a second sub-display part A22 arranged in a concentrated manner, a third sub-display part A23 and a fourth sub-display part A24 may also be included. Further, in the above four sub-display parts (A21, A22, A23 and A24) in the second display part A2, the gray scale values of the sub-pixels in the preceding row among the sub-pixels in two adjacent rows connected to the same data line may be different. The gray scale values of the first color sub-pixels in the next row may be the same (for example, the first preset gray scale in the first sub-display part A21 is not equal to the second preset gray scale in the second sub-display part A22). For example, the values corresponding to "gray scale 2" in the four sub-display parts (A21, A22, A23 and A24) may all be equal to 64. Values corresponding to "gray scale 1" may be 0, 35, 224, and 225, respectively. Combined with the above discussion about operation 5 and operation S7, four compensation data corresponding to four kinds of gray scale jumps (0 to 64, 35 to 64, 224 to 64, and 225 to 64) corresponding to the first color sub-pixels in the second display part A2 can be obtained respectively.

Continuing with the example in the second aspect above, for the first gray scale equal to the second gray scale (that is, gray scale 2, for example, 8), the second preset gray scale is equal to the third preset gray scale (that is, gray scale 1, for example, 244). However, when the distance between the second sub-display part and the first sub-display part is relatively long, it should be noted that the second brightness and the third brightness may also be different. The corresponding first compensation data (corresponding to X32 in 1 in the table) and second compensation data (corresponding to X32 in 1 in another table) may also be different. To sum up, based on the fact that the distance between the second sub-display part and the first sub-display part is far, any set of gray scale 2 and gray scale 1 may map unequal first compensation data and second compensation data, thereby forming two tables 1.

Figure 4:
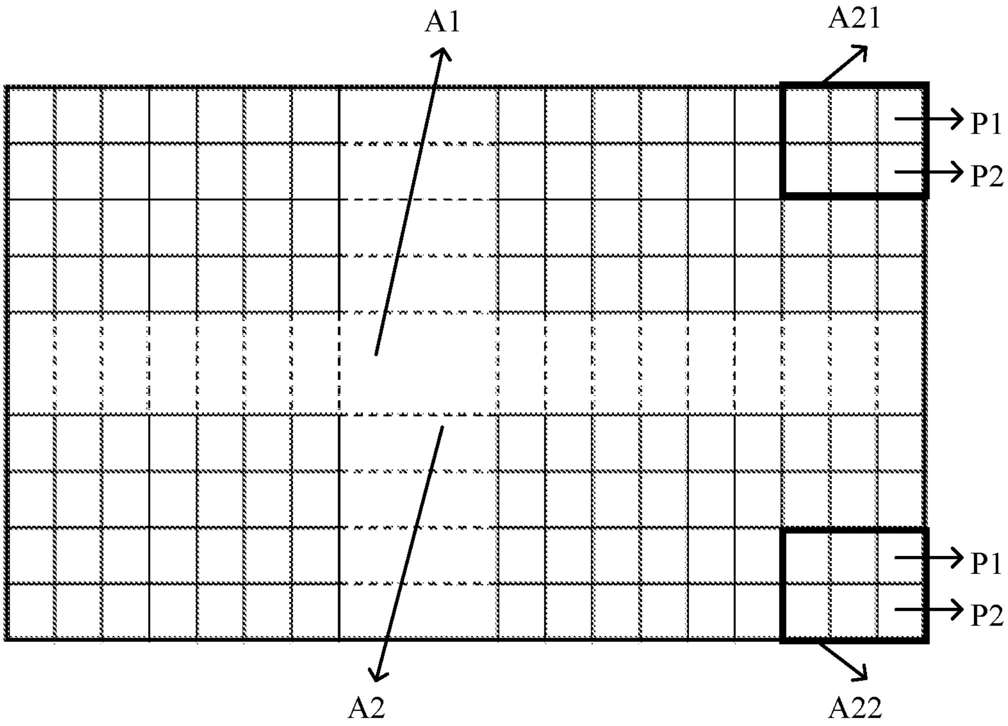
FIG. 4 is an arrangement diagram of a first display part and a second display part in a target panel provided by an embodiment of the present invention.

Specifically, as shown in FIG. 4, for example, the second display part A2 may include a first sub-display part A21 and a second sub-display part A22 that are distributed far apart. Further, both the first sub-display part A21 and the second sub-display part A22 may include at least the first color sub-pixel P1 and the second color sub-pixel P2 of different colors. Similarly, the second color sub-pixels P2 in the first sub-display part A21 and the second sub-display part A22 can also be combined with the discussion of operations S1 to S7 to obtain the corresponding Table 1 respectively. Specifically, when the first color sub-pixel P1 is a green sub-pixel, Table 1 of sub-pixels of other colors than the green sub-pixel (that is, P1) in the first sub-display part A21 and the second sub-display part A22 may be the same as Table 1 of the green sub-pixel (i.e., P1) in the first sub-display part A21 and the second sub-display part A22.

It should be noted that, as shown in Table 1, when gray scale 1 is equal to gray scale 2, it means that the gray scale values of two adjacent rows of sub-pixels connected to the same data line in the above embodiment are the same. That is to say, a light load image can be formed. It is not necessary to perform corresponding compensation for defects caused by heavy loaded images, but only perform compensation for defects that do not meet the brightness standard recognized by human eyes. That is, the corresponding plurality of first compensation data (second compensation data) can only perform compensation for defects that do not meet the brightness standard recognized by human eyes.

In this embodiment, there is no limitation on the relative positions of the first display part A1 and the second display part A2, and it can be considered that there is no intersection between them. Furthermore, compared with the second display part A2, the first display part A1 can be considered to be closer to the center of the target panel. For example, as shown in FIG. 4 and FIG. 5, the first display part A1 may include the center position of the target panel 10. The second display part A2 may be another display part outside the display area A of the target panel. That is, the second display part A2 may be disposed around the first display part A1.

The invention also provides a compensation method of a display panel. The display panel includes a plurality of rows of sub-pixels. Each row of sub-pixels is the first color sub-pixels, second color sub-pixels, or third color sub-pixels, the plurality of rows of sub-pixels are arranged cyclically in an order of the second color sub-pixels, the third color sub-pixels, and the first color sub-pixels in a column direction. As shown in FIG. 6, the compensation method of the display panel may include but not limited to the following operations.

Operation S01: Controlling the first display part of the target panel to display the light load image based on the standard gamma curve, and in the light load image, the second color sub-pixels, the third color sub-pixels, and the first color sub-pixels are displayed in a first test gray scale.

It can be understood that the difference from the above embodiment is that in this embodiment, the first color sub-pixels, the second color sub-pixels and the third color sub-pixels in the light load image all emit light at the same gray scale (the first test gray scale). That is, the multiple sub-pixels connected to each data line are displayed at the same gray scale (the first test gray scale). There is no jump in the data voltage on each data line. It can be considered that there is no issue of uneven display brightness as mentioned above, and it also conforms to the above discussion about "light load image".

Operation S02: Controlling the second display part of the target panel to display the heavy load image, wherein the second display part is located on at least one side of the first display part, the second color sub-pixels and the third color sub-pixels in the heavy load image are displayed in a second test gray scale, and the first color sub-pixels are displayed in the first test gray scale.

It can be understood that, corresponding to operation S01, all sub-pixels in the heavy loaded image also emit light. Different from operation S01, the second color sub-pixels and the third color sub-pixels in the second display part are all displayed in the second test gray scale. That is, among the plurality of sub-pixels connected by each data line, the gray scale changes from the third color sub-pixel to the first color sub-pixel (the second test gray scale becomes the first test gray scale). There is a jump in the data voltage on each data line. This can be considered as the issue of uneven display brightness, which is also in line with the above discussion about "heavy load image".

Operation S03: Acquiring a first test brightness of the first color sub-pixels in the first display part. In conjunction with the discussion of operation S01, the brightness of all first color sub-pixels in the first display part when displayed in the first test gray scale under a light load image can be obtained first. That is, it is the superposition of the brightness values of all the first color sub-pixels. Further, the average value of the brightness values of all the first color sub-pixels may be calculated as the first test brightness.

Operation S04: Acquiring a second test brightness of the sub-pixels of the first sub-display part in the second display part.

Combined with the discussion of operation S02, the brightness of all the first color sub-pixels in the first sub-display part when displayed in the first test gray scale under the heavy load screen may be obtained first. That is, it is the superposition of the brightness values of all the first color sub-pixels. Further, the average value of the brightness values of all the first color sub-pixels may be calculated as the second test luminance.

Operation S05: According to a difference between the first test brightness and the second test brightness, determining a fourth compensation data corresponding to the first test gray scale and the second test gray scale of at least the first color sub-pixels of the first sub-display part in the target panel.

The present invention also provides a compensation device, which can be used to implement the compensation method of the display panel as described above.

The present invention also provides a display panel including a processor configured to compensate the brightness of the sub-pixels of the first sub-display part according to the first compensation data and/or the fourth compensation data determined according to any one of the compensation methods of the display panel described above. For example, Table 1 may be combined to perform corresponding compensation according to gray scale 1, gray scale 2, and the mapped first compensation data. Therefore, it is improved that at least the sub-pixels of the first sub-display part in the target panel are subjected to the above gray scale changes. The defect of uneven brightness is caused by two reasons that do not meet the brightness standard recognized by the human eye and uneven charging and display.

Further, the display panel may further include a memory configured to store the first compensation data and/or the fourth compensation data determined according to any one of the compensation methods of the display panel described above.

Embodiments of the present invention provide a compensation device, a display panel, and a compensation method thereof. The first display part of the control target panel displays a light load image based on a standard gamma curve. The second display part of the target panel is controlled to display a heavy load image. Acquire the first brightness of the first color sub-pixels in the (N1+1)th row electrically connected to the first data line of the first display part. Acquire the second brightness of the first color sub-pixels in the (N2+1)th row of the first sub-display part in the second display part electrically connected to the second data line. According to the difference between the first brightness and the second brightness, it is determined that determined that at least the first color sub-pixel of the first sub-display part in the target panel corresponds to the first compensation data of the first gray scale and the second preset gray scale. That is to say, the present invention can use the first compensation data to improve at least the sub-pixels of the first sub-display part in the target panel when they are subjected to the above gray scale change (caused by brightness change, and the end point is the second brightness). The defect of uneven brightness is caused by two reasons that do not meet the brightness standard recognized by the human eye and uneven charging and display. This avoids storing at least two sets of data to respectively improve the above drawbacks, reducing the cost of the display panel.

The compensation device, the display panel and the compensation method thereof provided by the embodiments of the present invention have been introduced in detail above. In this description, specific examples are used to illustrate the principle and implementation of the present invention. The descriptions of the above embodiments are only used to help understand the technical solutions and core ideas of the present invention. Those of ordinary skill in the art should understand that they can still modify the technical solutions described in the foregoing embodiments or perform equivalent replacements for some of the technical features. However, these modifications or replacements do not make the essence of the corresponding technical solutions depart from the scope of the technical solutions of the embodiments of the present invention.

What is claimed is:

1. A compensation method of a display panel, comprising:

controlling a first display part of a target panel to display a light load image based on a standard gamma curve, wherein corresponding sub-pixels in an N1th row electrically connected to a first data line in the light load image are displayed in a first preset gray scale, corresponding sub-pixels in an (N1+1)th row are displayed in a first gray scale, and N1 is a positive integer;

controlling a second display part of the target panel to display a heavy load image, wherein the second display part is located on at least one side of the first display part, corresponding sub-pixels in an N2 row electrically connected to a second data line in the heavy load image are displayed in a second preset gray scale, corresponding sub-pixels in an (N2+1)th row are displayed in the first gray scale, N2 is a positive integer, N2 is equal to or not equal to N1, the first data line and the second data line are the same or different, and the sub-pixels in the (N1+1)th row and the sub-pixels in the (N2+1)th row are both first color sub-pixels;

acquiring a first brightness of the first color sub-pixels in the (N1+1)th row electrically connected to the first data line of the first display part;

acquiring a second brightness of the first color sub-pixels in the (N2+1)th row of a first sub-display part of the second display part electrically connected to the second data line; and according to a difference between the first brightness and the second brightness, determining a first compensation data corresponding to the first gray scale and the second preset gray scale of at least the first color sub-pixels of the first sub-display part in the target panel;

wherein corresponding sub-pixels in an N3th row electrically connected to a third data line in the heavy load image are displayed in a third preset gray scale, the first color sub-pixels corresponding to an (N3+1)th row are displayed in the second gray scale, the third preset gray scale is the same as or different from the second preset gray scale, and/or the second gray scale is the same as or different from the first gray scale, N3, N2, and N1 are the same or not the same, and the first data line, the second data line, and the third data line are the same or different, the method further comprises:

acquiring a third brightness of the first color sub-pixels in an (N3+1)th row electrically connected to the third data line in a second sub-display part of the second display part, and the third brightness is different from the second brightness;

according to a difference between the first brightness and the third brightness, determining a second compensation data of at least the first color sub-pixels of the second sub-display part in the target panel corresponding to the second gray scale and the third preset gray scale.

2. The compensation method of the display panel according to claim 1, wherein the first preset gray scale is equal to the first gray scale.

3. The compensation method of the display panel according to claim 1, wherein the second sub-display part is adjacent to the first sub-display part.

4. The compensation method of the display panel according to claim 1, wherein there are a plurality of sub-pixels between the second sub-display part and the first sub-display part.

5. The compensation method of the display panel according to claim 1, wherein the sub-pixels in the N1 row in the light load image are displayed in the first preset gray scale, the first color sub-pixels corresponding to the (N1+1)th row are displayed in the first gray scale;

the sub-pixels in the N2 row in the heavy load image are displayed in the second preset gray scale, the first color sub-pixels corresponding to the (N2+1)th row are displayed in the first gray scale;

acquiring the first brightness of the first color sub-pixels in the (N1+1)th row electrically connected to the first data line of the first display part comprises:

acquiring a plurality of first actual brightness values corresponding to the first color sub-pixels in the (N1+1)th row of the first display part, and calculating an average value of the plurality of the first actual brightness values as the first brightness;

acquiring the second brightness of the first color sub-pixels in the (N2+1)th row of the first sub-display part of the second display part electrically connected to the second data line comprises:

acquiring a plurality of second actual brightness values corresponding to the first color sub-pixels in the (N2+1)th row of the first sub-display part, and calculating an average value of the plurality of second actual brightness values as the second brightness.

6. The compensation method of the display panel according to claim 1, wherein controlling the first display part of the target panel to display the light load image based on the standard gamma curve comprises:

according to a difference between the standard gamma curve and an original gamma curve of the first display part, determining a third compensation data of the first display part;

according to the third compensation data, controlling the first display part to display the light load image.

7. A compensation method of a display panel, wherein the display panel comprises a plurality of rows of sub-pixels, each row of sub-pixels is first color sub-pixels, second color sub-pixels, or third color sub-pixels, the plurality of rows of sub-pixels are arranged cyclically in an order of the second color sub-pixels, the third color sub-pixels, and the first color sub-pixels in a column direction, and the method comprises:

controlling a first display part of a target panel to display a light load image based on a standard gamma curve, and in the light load image, the second color sub-pixels, the third color sub-pixels, and the first color sub-pixels are displayed in a first test gray scale;

controlling a second display part of the target panel to display a heavy load image, wherein the second display part is located on at least one side of the first display part, the second color sub-pixels and the third color sub-pixels in the heavy load image are displayed in a second test gray scale, and the first color sub-pixels are displayed in the first test gray scale;

acquiring a first test brightness of the first color sub-pixels in the first display part;

acquiring a second test brightness of the sub-pixels of the first sub-display part in the second display part; and according to a difference between the first test brightness and the second test brightness, determining a fourth compensation data corresponding to the first test gray scale and the second test gray scale of at least the first color sub-pixels of the first sub-display part in the target panel.

8. A display panel, comprises:

a processor configured to compensate a brightness of sub-pixels in a first sub-display part according to a first compensation data determined by a compensation method of a display panel, wherein the compensation method of the display panel comprises:

controlling a first display part of a target panel to display a light load image based on a standard gamma curve, wherein corresponding sub-pixels in an N1th row electrically connected to a first data line in the light load image are displayed in a first preset gray scale, corresponding sub-pixels in an (N1+1)th row are displayed in a first gray scale, and N1 is a positive integer;

controlling a second display part of the target panel to display a heavy load image, wherein the second display part is located on at least one side of the first display part, corresponding sub-pixels in an N2 row electrically connected to a second data line in the heavy load image are displayed in a second preset gray scale, corresponding sub-pixels in an (N2+1)th row are displayed in the first gray scale, N2 is a positive integer, N2 is equal to or not equal to N1, the first data line and the second data line are the same or different, and the sub-pixels in the (N1+1)th row and the sub-pixels in the (N2+1)th row are both first color sub-pixels;

acquiring a first brightness of the first color sub-pixels in the (N1+1)th row electrically connected to the first data line of the first display part;

acquiring a second brightness of the first color sub-pixels in the (N2+1)th row of a first sub-display part of the second display part electrically connected to the second data line; and according to a difference between the first brightness and the second brightness, determining the first compensation data corresponding to the first gray scale and the second preset gray scale of at least the first color sub-pixels of the first sub-display part in the target panel;

wherein corresponding sub-pixels in an N3th row electrically connected to a third data line in the heavy load image are displayed in a third preset gray scale, the first color sub-pixels corresponding to an (N3+1)th row are displayed in the second gray scale, the third preset gray scale is the same as or different from the second preset gray scale, and/or the second gray scale is the same as or different from the first gray scale, N3, N2, and N1 are the same or not the same, and the first data line, the second data line, and the third data line are the same or different, the method further comprises:

acquiring a third brightness of the first color sub-pixels in an (N3+1)th row electrically connected to the third data line in a second sub-display part of the second display part, and the third brightness is different from the second brightness;

according to a difference between the first brightness and the third brightness, determining a second compensation data of at least the first color sub-pixels of the second sub-display part in the target panel corresponding to the second gray scale and the third preset gray scale.

9. The display panel according to claim 8, further comprising a memory configured to store the first compensation data.

10. The display panel according to claim 8, further comprising a plurality of rows of sub-pixels, wherein each row of sub-pixels is the first color sub-pixels, second color sub-pixels, or third color sub-pixels, the plurality of rows of sub-pixels are arranged cyclically in an order of the second color sub-pixels, the third color sub-pixels, and the first color sub-pixels in a column direction;

wherein the processor is further configured to compensate the brightness of the sub-pixels in the first sub-display part according to a fourth compensation data determined by the compensation method of the display panel, wherein the compensation method of the display panel further comprises:

controlling the first display part of the target panel to display the light load image based on the standard gamma curve, and in the light load image, the second color sub-pixels, the third color sub-pixels, and the first color sub-pixels are displayed in a first test gray scale;

controlling the second display part of the target panel to display the heavy load image, wherein the second display part is located on at least one side of the first display part, the second color sub-pixels and the third color sub-pixels in the heavy load image are displayed in a second test gray scale, and the first color sub-pixels are displayed in the first test gray scale;

acquiring a first test brightness of the first color sub-pixels in the first display part;

acquiring a second test brightness of the sub-pixels of the first sub-display part in the second display part; and according to a difference between the first test brightness and the second test brightness, determining a compensation data corresponding to the first test gray scale and the second test gray scale of at least the first color sub-pixels of the first sub-display part in the target panel.

11. The display panel according to claim 10, further comprising a memory configured to store the compensation data.

* * * * *